United States Patent
Beitler et al.

(10) Patent No.: US 11,520,939 B2
(45) Date of Patent: Dec. 6, 2022

(54) PROTECTING COMPUTER SYSTEMS FROM MALICIOUS USB DEVICES VIA A USB FIREWALL

(71) Applicant: International Business Machines Corporation, Armonk, NY (US)

(72) Inventors: Anton Beitler, Zurich (CH); Jiyong Jang, White Plains, NY (US); Dhilung Hang Kirat, White Plains, NY (US); Anil Kurmus, Rueschlikon (CH); Matthias Neugschwandtner, Zurich (CH); Marc Philippe Stoecklin, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 15/461,638

(22) Filed: Mar. 17, 2017

(65) Prior Publication Data
US 2018/0270194 A1    Sep. 20, 2018

(51) Int. Cl.
| | |
|---|---|
| *H04L 29/06* | (2006.01) |
| *G06F 13/42* | (2006.01) |
| *G06F 13/38* | (2006.01) |
| *G06F 21/85* | (2013.01) |
| *H04L 9/40* | (2022.01) |
| *G06F 21/60* | (2013.01) |
| *G06F 21/55* | (2013.01) |

(52) U.S. Cl.
CPC ............ *G06F 21/85* (2013.01); *G06F 13/385* (2013.01); *G06F 13/4282* (2013.01); *G06F 21/554* (2013.01); *G06F 21/604* (2013.01); *H04L 63/1408* (2013.01)

(58) Field of Classification Search
CPC ......... H04L 63/02; H04L 63/14; H04L 63/20; G06F 13/385; G06F 13/4282; G06F 21/85; G06F 21/567; G06F 21/606
See application file for complete search history.

(56) References Cited

U.S. PATENT DOCUMENTS

| | | | |
|---|---|---|---|
| 6,970,954 B1 * | 11/2005 | Guy ........................ | G06F 21/52 709/230 |
| 7,886,353 B2 | 2/2011 | Avraham et al. | |
| 7,912,987 B2 | 3/2011 | Zhong et al. | |

(Continued)

OTHER PUBLICATIONS

SandUSB: An installation-free sandbox for USB peripherals, Loe et al, Dec. 2016 (Year: 2016).*

(Continued)

*Primary Examiner* — Jahangir Kabir
(74) *Attorney, Agent, or Firm* — Harrington & Smith

(57) ABSTRACT

USB traffic is intercepted between a USB device and a computer system. It is determined whether the USB device has previously had a policy associated with it as to whether USB traffic from the device should be blocked, allowed, or sanitized. In response to not having a previous policy for the USB device, a request is made for a user to be prompted to provide a policy of one of block, allow, or sanitize for the USB device. In response to a user-provided-policy, one of the following are performed: blocking the traffic, allowing (Continued)

the traffic, or sanitizing the traffic between the USB device and the computer system. Apparatus, methods, and computer program products are disclosed.

20 Claims, 7 Drawing Sheets

(56) References Cited

U.S. PATENT DOCUMENTS

| | | | |
|---|---|---|---|
| 7,974,577 B2 | 7/2011 | Stephens, Jr. | |
| 8,209,739 B2 | 6/2012 | Terpening et al. | |
| 8,560,864 B2 | 10/2013 | Chang et al. | |
| 8,646,082 B2 | 2/2014 | Lomont et al. | |
| 8,694,695 B2 | 4/2014 | Lee | |
| 8,862,803 B2 | 10/2014 | Powers et al. | |
| 9,154,377 B1* | 10/2015 | Sokolov | H04L 41/0893 |
| 9,237,125 B1 | 1/2016 | Bardgett | |
| 9,392,021 B1 | 7/2016 | Labana et al. | |
| 9,430,621 B2 | 8/2016 | Larky et al. | |
| 9,641,544 B1* | 5/2017 | Treat | H04L 43/04 |
| 9,973,471 B2 | 5/2018 | Chen | |
| 9,990,325 B2 | 6/2018 | Hetzleer et al. | |
| 10,216,673 B2* | 2/2019 | Beitler | G06F 13/385 |
| 2008/0005116 A1* | 1/2008 | Uno | G06F 3/0622 |
| 2011/0030030 A1 | 2/2011 | Terpening et al. | |
| 2012/0240234 A1* | 9/2012 | Lomont | G06F 21/85 726/24 |
| 2012/0311207 A1* | 12/2012 | Powers | G06F 13/42 710/106 |
| 2013/0014221 A1* | 1/2013 | Moore | G06F 21/85 726/3 |
| 2014/0019651 A1 | 1/2014 | Ben-Harosh | |

OTHER PUBLICATIONS

CIRCLean—USB key sanitizer (2008-2016), (downloaded on Oct. 24, 2016 from https://www.circl.lu/projects/CIRCLean/), (11 pages).
Dan Goodin, "This thumbdrive hacks computers. 'BadUSB' exploit makes devices turn 'evil'", Ars Technica (Jul. 31, 2014) (downloaded on Oct. 12, 2016 from http://arstechnica.com/security/2014/07/this-thumbdrive-hacks-computers-badusb-exploit-makes-devices-turn-evil/), (5 pages).
Ironkey Secure USB Devices (2016) (downloaded on Oct. 12, 2016 from http://www.ironkey.com/en-US/solutions/protect-against-badusb.html), (3 pages).
CIRCLean: USB key sanitizer (2008-2016) (downloaded on Oct. 12, 2016 from https://www.circl.lu/projects/CIRCLean/), (11 pages).
SafeSquid Secure Web Gateway (2016) (downloaded on Oct. 12, 2016 from https://www.safesquid.com/), (2 pages).
SafeSquid Secure Web Gateway, Overview (2016) (downloaded on Oct. 12, 2016 from https://www.safesquid.com/content-filtering/overview), (5 pages).
NIST, Vulnerability Summary for CVE-2016-2384, National Vulnerability Database (2016) (downloaded on Oct. 12, 2016 from https://web.nvd.nist.gov/view/vuln/detail?vulnId=CVE-2016-2384), (3 pages).
"SyncStop/USB condom, charge your mobile phone safely" (2016), (downloaded on Oct. 24, 2016 from http://syncstop.com), (7 pages).
Dave Tian, Adam Bates, Kevin Butler, "Defending Against Malicious USB Firmware with GoodUSB", ACSAC'15, L.A., CA, USA, Dec. 10, 2015, (26 pages).
USB killer (2016) (downloaded on Oct. 24, 2016 from https://www.usbkill.com/), (6 pages).

* cited by examiner

PROTECTING COMPUTER SYSTEMS FROM MALICIOUS USB DEVICES VIA A USB FIREWALL

BACKGROUND

This invention relates generally to serial buses and, more specifically, relates to protecting computer systems from USB devices.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations and acronyms used in this document and/or the drawings are defined below, prior to the claims.

Universal serial bus (USB) connections and devices have become ubiquitous, and for good reason: these allow users to connect many different devices through a common connection and interface. For instance, a user can connect peripherals such as pointing devices (e.g., trackballs or mice), audio cards or digital-to-analog converters, keyboards, memories such as memory sticks or hard drives, cameras, cellular phones, and the like to hosts such as computers, all with a single physical interface.

The pervasive availability of USB connectivity throughout computer and mobile peripherals, however, makes USB an increasingly appealing attack vector. In particular, USB devices, upon their activation when connected (plugged in) to a host machine, run a piece of software (e.g., firmware) that is responsible with interacting with the host machine using the USB protocol over the bus. USB devices (or the firmware installed on the devices) may be subverted, which enables a variety of threats. For example, (1) a secondary USE device may announce itself in parallel to the actual primary device, or (2) the USB firmware may attempt to exploit vulnerabilities in the software stack interacting with the USB bus (such as lower- and upper-level drivers in the kernel, and applications using the device). Recently successful examples of such exploits have been demonstrated in practice.

One successful example is referred to as a schizophrenic USB device. A schizophrenic USB device registers as an additional input device, like a keyboard, alongside its expected functionality. The mimicked keyboard would then commence sending keystrokes to the host machine to spawn a shell and open, e.g., a network connection to a remote server to exfiltrate data or provide advanced remote command and control over the host. Such attacks are facilitated by dedicated, programmable devices like the Rubber Ducky (a device which resembles a regular USB flash drive). Using Rubber Ducky, it is possible to load a "trusted" root certificate into a victim's machine to launch a MitM attack, e.g., decrypting SSL traffic. In a MitM attack, an attacker secretly relays and possibly alters the communication between two parties who believe they are directly communicating with each other. In this example, the MitM attack is between the Rubber Ducky and the victim's machine.

Other successful examples are USB delivered exploits. This refers to USB devices that exploit parts of the operating system, for example bugs in the USB driver stack. These bugs can be found by fuzzing the USB driver stack or applications that handle USB "traffic". One example is the "USB Stick of Death" that exploits a vulnerability in the Windows NTFS driver.

Consequently, while USB devices are undoubtedly beneficial, they have also become more dangerous. It is currently difficult to prevent or ameliorate attacks by misbehaving USB devices.

BRIEF SUMMARY

This section is intended to include examples and is not intended to be limiting.

In an exemplary embodiment, a method comprises intercepting universal serial bus (USB) traffic between a USB device and a computer system, and determining whether the USB device has previously had a policy associated with it as to whether USB traffic from the device should be blocked, allowed, or sanitized. The method further comprises, in response to not having a previous policy for the USB device, requesting that a user be prompted to provide a policy of one of block, allow, or sanitize for the USB device. The method additionally comprises, in response to a user-provided policy, performing one of blocking the traffic, allowing the traffic, or sanitizing the traffic between the USB device and the computer system.

In another exemplary embodiment, an apparatus comprises: one or more memories comprising computer readable code stored thereon; one or more processors, the one or more processors configured, in response to retrieval and execution of at least a portion of the computer readable code, to cause the apparatus to perform operations comprising: intercepting universal serial bus (USB) traffic between a USB device and a computer system; determining whether the USB device has previously had a policy associated with it as to whether USB traffic from the device should be blocked, allowed, or sanitized; in response to not having a previous policy for the USB device, requesting that a user be prompted to provide a policy of one of block, allow, or sanitize for the USB device; and in response to a user-provided policy, performing one of blocking the traffic, allowing the traffic, or sanitizing the traffic between the USB device and the computer system.

In a further exemplary embodiment, a computer program product comprises a computer readable storage medium having program instructions embodied therewith, the program instructions executable by a device to cause the device to perform operations comprising: intercepting universal serial bus (USB) traffic between a USB device and a computer system; determining whether the USB device has previously had a policy associated with it as to whether USB traffic from the device should be blocked, allowed, or sanitized; in response to not having a previous policy for the USB device, requesting that a user be prompted to provide a policy of one of block, allow, or sanitize for the USB device; and in response to a user-provided policy, performing one of blocking the traffic, allowing the traffic, or sanitizing the traffic between the USB device and the computer system.

BRIEF DESCRIPTION OF THE DRAWINGS

In the attached Drawing Figures:

FIG. 1, which includes FIGS. 1A and 1B, contains block diagrams of a possible and non-limiting exemplary embodiment (e.g., "embodiment 1"), where

FIG. 2, which includes FIGS. 2A and 2B, contains block diagrams of another possible and non-limiting exemplary embodiment (e.g., "embodiment 2"), where

FIG. 4, which includes FIGS. 4A and 4B, contains block diagrams of a possible and non-limiting exemplary embodiment, where

DETAILED DESCRIPTION OF THE DRAWINGS

Figure 1A:
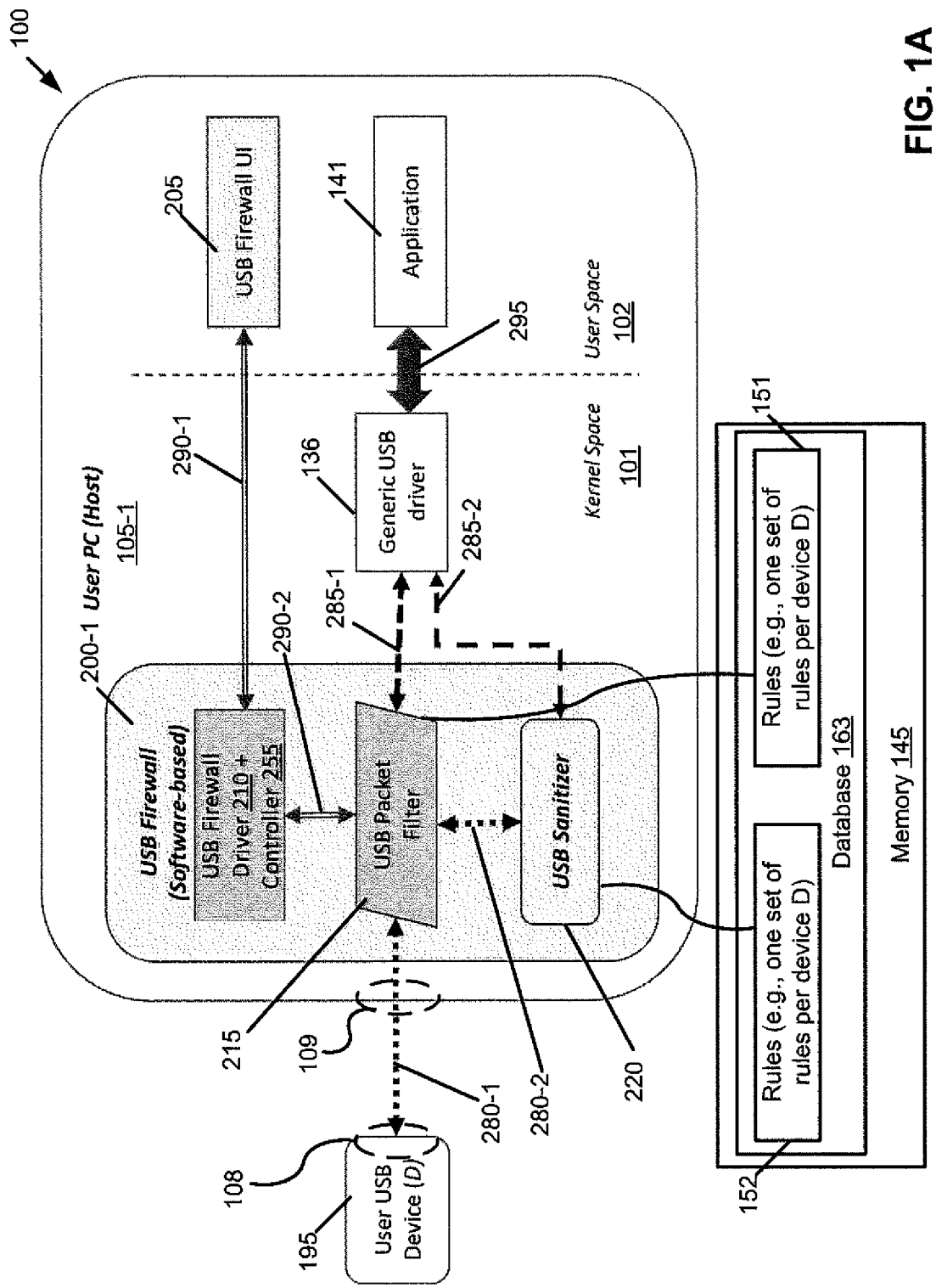
FIG. 1A presents a logical setup for a system including a low-level USB firewall software component as part of a user PC (host)

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Systems and methods are described to construct a software-based or hardware-based middle layer (referred to as a USB firewall) that has the ability to intercept and inspect connecting/connected USB device traffic on a USB bus, reroute the traffic (e.g., to a sandbox system), drop the traffic, or allow the traffic. The disclosed systems and methods prevent unauthorized devices (and corresponding firmware) from interacting directly with the host machine; rather traffic is quarantined and only upon successful verification and approval is the traffic directed to the host machine. Moreover, the described systems and methods may, in certain exemplary embodiments, enable end-users to inspect the USB devices on the bus, and selectively allow or disallow interaction with the host machine.

There are two primary exemplary embodiments described herein: 1. A low-level USB firewall software-based component; and 2. A separate device. In exemplary embodiment 1, USB bus traffic is intercepted at a low level and a firewall functionality is established on the host system. In exemplary embodiment 2, a separate dedicated device with USB connectors is implemented that offers the functionality of a firewall. All USB devices would typically be connected to this dedicated device.

A fundamental advantage of the systems and methods disclosed herein is an increased layer of protection and practicality of these solutions compared with existing methods and systems. Moreover, the techniques presented herein allow for a number of extensions beyond simple "allow and deny", such as rerouting of USB traffic into a sanitizer system first, USB traffic behavior analysis, selective filtering, and the like. Lastly, the techniques presented herein are not limited to a specific type of USB device (such as not being only limited to mass storage devices).

As far as transparency of the firewall is concerned, the firewall will operate transparently to the devices (i.e., connected devices are unable to tell whether they are connected to a host system directly or a USB firewall device is located in-between). The firewall is however not transparent to the host system, i.e., the host system knows that a firewall is connected (e.g., due to a control channel established). The firewall also may not be transparent to a user of a computing system to which the user has attached a USB device.

FIGS. 1 and 2 compare the two embodiments: a software-based USB firewall ("embodiment 1", illustrated in FIG. 1) and hardware USB firewall ("embodiment 2", illustrated in FIG. 2). FIG. 1 illustrates a software-based USB firewall 200, USB firewall 200-1, while FIG. 2 illustrates a physically separate device of a USB firewall device 200-2 for USB firewall 200.

Figure 1B:
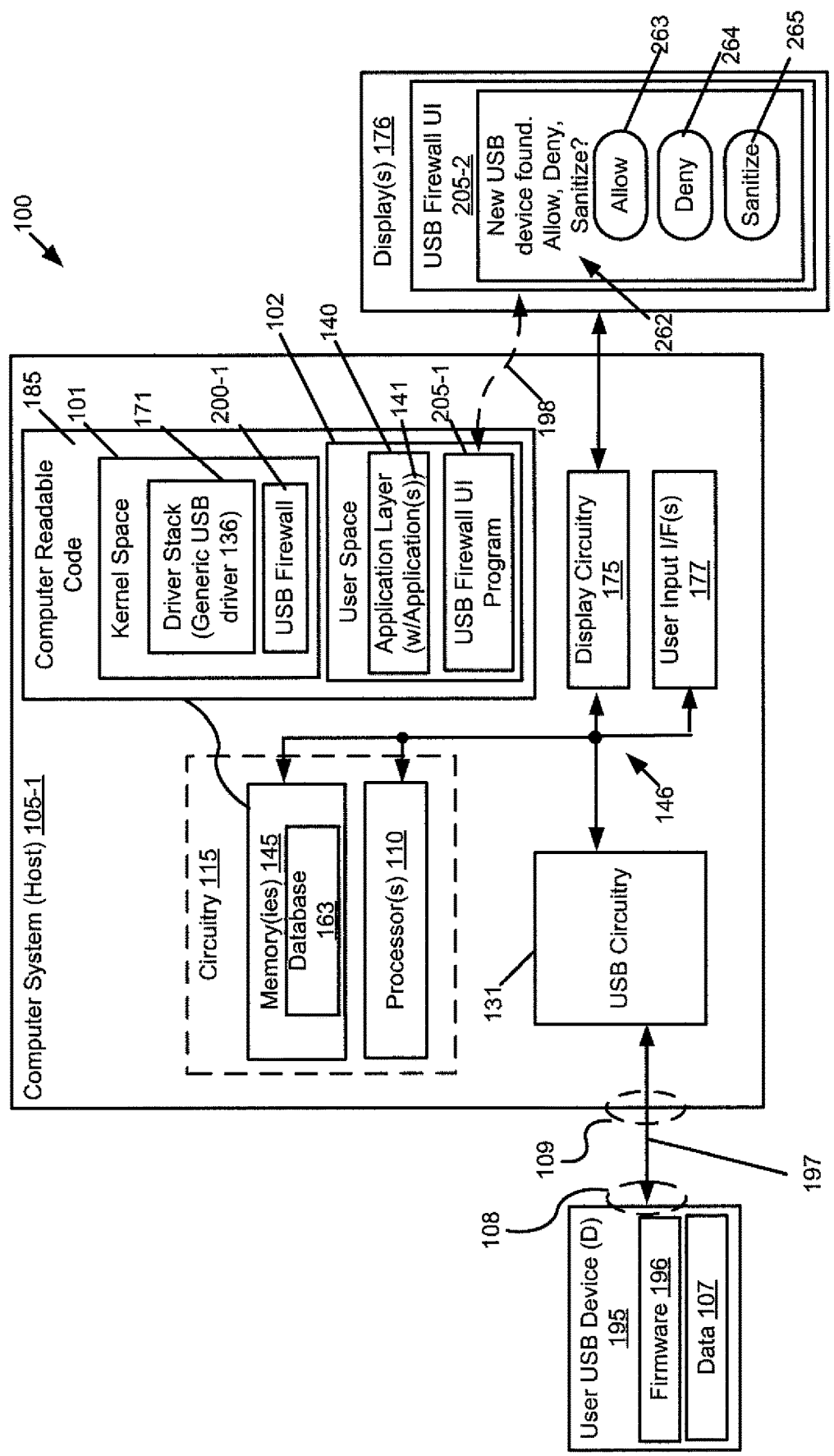
FIG. 1B illustrates possible internal configuration of the elements of the system in FIG. 1A.

Referring now to FIG. 1, which includes FIGS. 1A and 1B, this figure contains block diagrams of a possible and non-limiting exemplary embodiment (e.g., "embodiment 1"). Specifically, FIG. 1A presents a logical setup for a system 100 including a low-level USB firewall software component as part of a user PC (host), and FIG. 1B illustrates possible internal configuration of the elements of the system in FIG. 1A.

In FIG. 1A, a user has attached a user USB device (D) 195 to the user PC 105-1, typically referred to as a host (e.g., of the USB bus). The elements in FIG. 1A are logical and represent software and data flow. The software will be executed by hardware to cause the user PC 105-1 to perform operations described herein for protecting computer systems from malicious USB devices via a USB firewall. The user USB device (D) 195 is going to communicate with application 141, which may be any application on the computer system. The user USB device (D) 195 may have a USB port 108 and the user PC 105-1 may have a corresponding USB port 109. For instance, the USB port 108 could be a physical male USB connector and the USB port 109 could be a physical female USB connector, and the data path 280-1 would be formed over the two USB ports 108, 109. In another example, the USB port 108 is a female USB connector and the data path 280-1 is formed in part using a USB cable between the two USB ports 108, 109. Other configurations are also possible.

The user PC 105-1 is represented as having a kernel space 101 and a user space 102. The kernel space 101 includes the kernel (not shown), which is the central module of an operating system (OS). The kernel is the part of the operating system that loads first, and the kernel typically remains in main memory. The kernel space is part of the kernel. The software-based USB firewall 200-1 runs in the kernel space 101 and thus runs at a low level, e.g., with privileged access to system resources and in protected memory. The kernel space 101 also includes a generic USB driver 136. The software-based USB firewall 200-1 comprises a USB firewall driver 210 and controller 255, a USB packet filter 215, and a USB sanitizer 220.

The user space 102 comprises a USB firewall UI 205 and an application 141. The user space 102 is a memory area where application software and some drivers execute. An OS separates the kernel space 101 and user space 102. The generic USB driver 136 interfaces with the application 141, which does not "know" there is a firewall 200-1. The generic USB driver 136 has the proper programming to interface with the user USB device 195. That is, the generic USB driver 136 is a driver that is used to understand a given device's operations (e.g., when one connects a storage device or a web cam, separate drivers are loaded that enable communication of applications with the device over a proprietary channel). For instance, the generic USB driver 136 can act as an interface between the application 141 and any USB device, such as a keyboard, webcam, digital-to-analog converter, smartphone, storage device, and the like.

In this example, the USB firewall UI 205 and the USB firewall 200-1 are additions to a user PC. The data path 280-1 (between the user USB device (D) 195 and the USB packet filter 215) and the data path 280-2 (between the USB packet filter 215 and the USB sanitizer 220) contain untrusted USB traffic. The data path 285-1 (between the USB packet filter 215 and the generic USB driver 136) and data path 285-2 (between the USB sanitizer 220 and the generic USB driver 136) contain filtered USB traffic. The path 290-1 between the USB firewall driver 210/controller 255 and the USB firewall UI 205 is a control channel. The path 290-2 between the USB packet filter 215 and the USB firewall driver 210/controller 255 is also a control channel. The path 295 between the generic USB driver 136 and the application 141 includes both data and command.

The USB firewall driver 210 implements low-level drivers enabling the USB firewall 200-1 to communicate with the user USB device 195, and the controller 255 controls the overall operation of the USB firewall 200-1. The USB packet filter 215 filters packets between the user USB device 195 and the generic USB driver 136, such as forwarding packets between the two devices 195, 136, not forwarding (e.g., dropping) packets between the two devices 195, 136, or sending packets to the USB sanitizer 220 for sanitization. The USB packet filter 215 uses rules 151 for determining what should be filtered or sanitized. There could be multiple sets of rules 151, e.g., one set of rules 151 per user USB device 195. For instance, there could be one set of rules 151 for a keyboard, one set of rules 151 or a webcam, one set of rules for a storage device, and the like. If a packet is or packets are to be sanitized, the USB packet filter 215 sends the packet or packets to the USB sanitizer 220.

The USB sanitizer 220 then performs sanitization of the packet or packets based. on an additional set of rules 152, which again may have multiple sets of rules 152 based on the user USB device 195. The sanitization could involve changing or translating certain commands or requests that are known to be problematic into other commands or requests that are known to be good, or stripping out certain commands or requests, or other actions as are known.

The functions of the USB packet filter 215 and the USB sanitizer 220 may be combined if desired, and in addition or alternatively, the rules 151 and 152 may be combined. In an example, each of the rules 151, 152 may be stored as part of the corresponding USB packet filter 215 or USB sanitizer 220, or may be stored as part of a single database 163, e.g., accessible by both the USB packet filter 215 or USB sanitizer 220. The database in FIGS. 1A and 1B is illustrated as being part of the memory 145, which may be a cache memory and may be volatile or non-volatile, depending on implementation. The rules 151, 152 may be downloaded, e.g., from a computer system on the cloud or the Internet, provided with the USB firewall 200-1, and the like. It is further noted that these are characterized as "rules", but these may also be characterized as "policies" or "verdicts", and the term used may vary by which company implements these. In this document, the term "rules" is meant to encompass instructions for one or both of filtering and sanitizing USB traffic.

With reference to FIG. 1B, the computer system 105-1, in this example, comprises one or more memories 145, one or more processors 110, USB circuitry 131, display circuitry 175, and one or more user input interface(s) (I/Fs), all interconnected through one or more buses 146. The buses 146 may be address, data, and/or control buses and may be implemented using many different techniques, such as traces on a board, metallization in a semiconductor, and the like. The one or more memories 145 comprise computer readable code 185 comprising the kernel space 101 and the user space 102. The kernel space 101 comprises a driver stack 171, which includes the generic USB driver 136, and the USB firewall 200-1. The computer system 105 may also be connected to one or more displays 176, driven by the display circuitry 175. The computing system 105 may include a display 176, such as if the computer system 105 is a smartphone or tablet. The one or more user input interfaces 177 comprise circuitry to allow a user to provide input to the computer system 105-1, such as via a wireless interface (e.g., Bluetooth, which is a short range wireless connectivity standard) or a wired interface to input devices (not shown) such as a mouse, keyboard, and the like.

The user space 102 comprises an application layer 140 (e.g., including the application 141 and possibly other applications) and USB firewall 205, which is represented as USB firewall UI program 205-1 and a USB firewall UI 205-2 on the display(s) 176. The USB firewall UI program 205-1 causes the USB firewall UI 205-2 to be presented on the display 176, as illustrated in part by reference 196.

The one or more processors 110 can be any processors suitable to the technical environment, such as single or multiple core processors, low power processors such as Advanced RISC Machine (ARM) processors, digital signal processors, special-purpose processors, and the like. The term "processor" is also meant to encompass any circuitry that can perform processing functions, such as a very large scale integrated circuit, programmable logic devices, and the like. The one or more processors 110, in response to executing the computer readable code 185, cause the computer system 105 to perform the operations described herein. In another example, part or all of the computer readable code 185 could be implemented in hardware, such as in circuitry 115. The circuitry 115 could be implemented as part of an integrated circuit, as part of a programmable gate array, as part of a USB hub, as part of USB circuitry such as a USB controller, and the like. In this example, the circuitry 115 is considered to contain the one or more processors 110 and the one or more memories 145, but only part of this functionality may be implemented by the circuitry 115, and other functionality implemented by a separate processor 110 and memory 145.

The one or more memories 145 may comprise any suitable memory, such as non-volatile memory comprising one or more of (e.g., programmable) read-only memory, flash memory, various types of magnetic computer storage devices (e.g., hard disk drives), optical discs, and the like. The one or more memories 145 may additionally comprise volatile memory such as random access memory (RAM), e.g., static RAM and/or dynamic RAM.

The USB device 195 comprises firmware 196 and data 107 and is connected via the USB bus 197 to the USB circuitry 131. The USB circuitry 131 could include, e.g., USB controllers and corresponding USB hubs that are internal to the host 105-1. The USB circuitry 131 performs known USB techniques, such as providing power for USB devices, and sending and receiving packets. The firmware 196 is used by the USB device 195 to perform actions to interface with a USB bus 197 and a host 105. The data 107 may be stored data, such as non-volatile data on a memory stick or hard drive, or such as volatile data generated and briefly stored for sending to the host, like keyboard strokes, mouse actions, and similar events. That is, the data 107 depend on the type for the USB device 195. The data 107 may also include packets that are used to communicate via the USB bus 197 and that package the stored data for communications.

The USB firewall driver 210 provides an interface between the USB packet filter 215 and the USB firewall UI 205. The USB firewall driver 210 and the controller 255 of the firewall may be based in firmware that is executed by hardware. The USB packet filter 215 enforces a policy, such as blocking or allowing traffic. The USB sanitizer 220 sanitizes USB traffic using techniques described above. As previously described, the generic USB driver 136 is a driver that is used to understand a given device's operations (e.g., when one connects a storage device or a web cam, separate drivers are loaded that enable communication of applications with the device over a proprietary channel).

The USB firewall UI 205, as a program 205-1 and a UI 205-2 created by the program 205-1, allows the USB firewall 200-1 to interact with a user, e.g., using the display 176. For instance, the USB firewall 200-1 may be configured in whole or part by the user using the UI 205-2. As another example, the USB firewall program 205-1 may create (as part of UT 205-2 on display 176) a message 262 to the user that a new USB device has been found and request the user choose whether to allow, deny or sanitize the USB device. The user could select one of the buttons on the display of Allow 263, Deny 264 or Sanitize 265. The user could perform the selections using any available input, such as touch using a touchscreen or a device (including a user USB device 195) such as a keyboard, mouse, trackball, or the like. The actions taken by the USB firewall 200 in response to selection of one of these buttons are described below. Note that the buttons are merely one example and many other techniques may be used, such as pulldown menus, swiping, and the like.

Figure 2A:
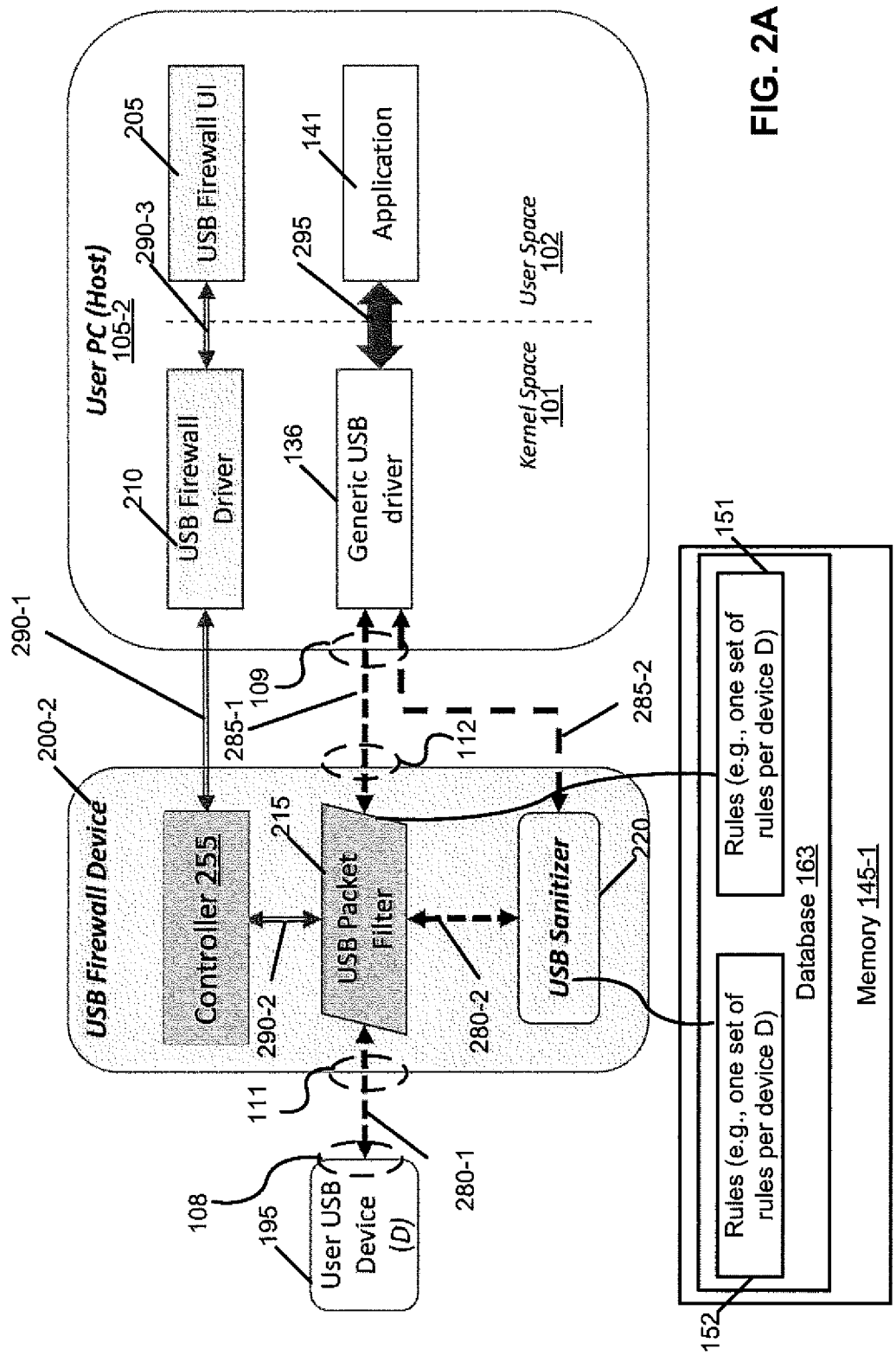
FIG. 2A presents a logical setup for a system including a USB device separate from a user PC (host)
Figure 2B:
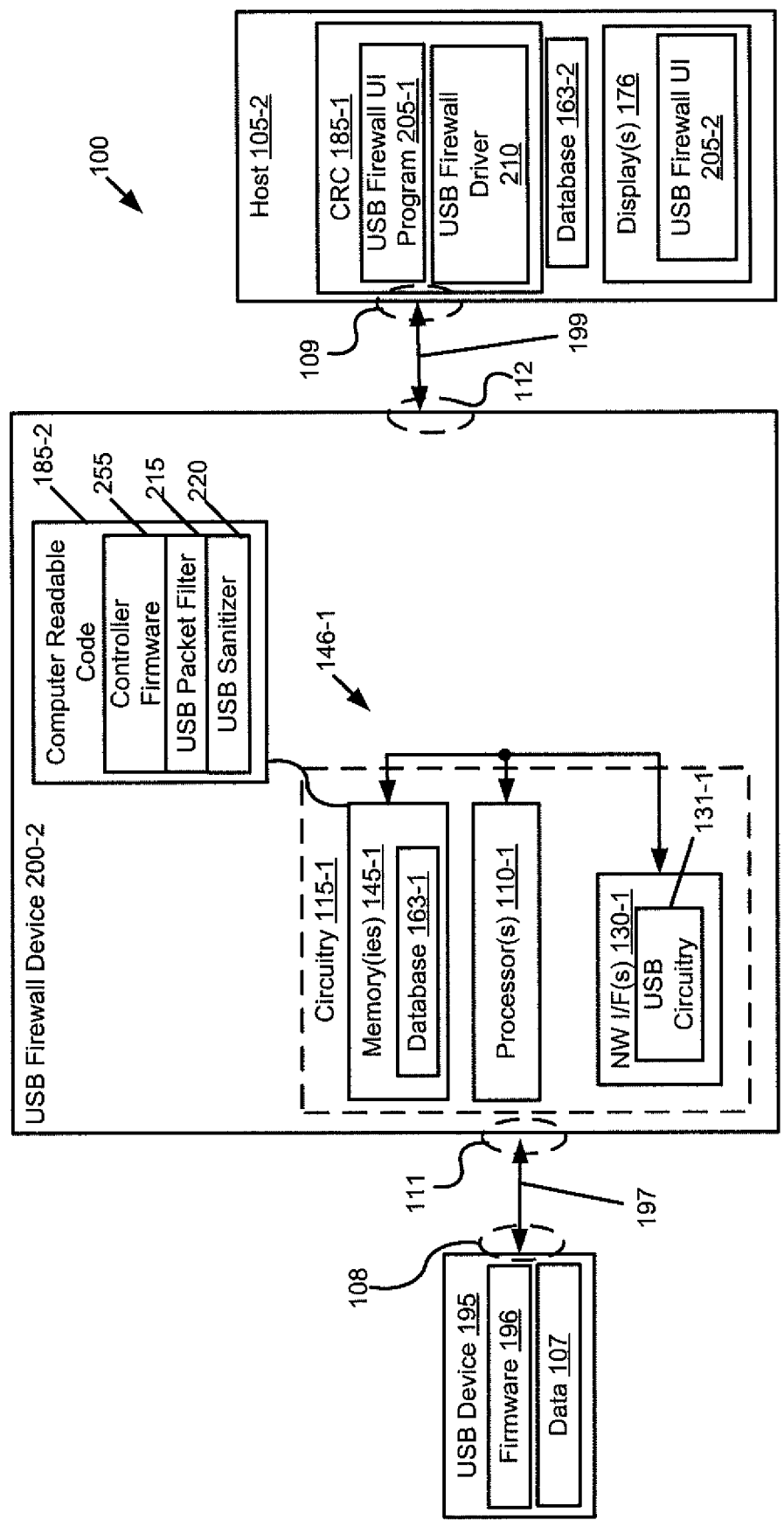
FIG. 2B illustrates possible internal configuration of the elements of the system in FIG. 2A.

Turning to FIG. 2, which includes FIGS. 2A and 2B, this figure contains block diagrams of another possible and non-limiting exemplary embodiment (e.g., "embodiment 2"). FIG. 2A presents a logical setup for a system including a USB device separate from a user PC (host), and FIG. 2B illustrates possible internal configuration of the elements of the system in FIG. 2A. The example of FIG. 2 uses many of the same elements in FIG. 1, and only the differences are described here.

In FIG. 2A, the USB firewall 200 is illustrated as a USB firewall device 200-2. The USB firewall device 200-2 contains similar elements to those elements in the software-based USB firewall 200-1, but is physically separate from the user PC 105-2. The USB firewall device 200-2 is between the user USB device (D) 195 and the user PC 105-2. The USB firewall device 200-2 could have a female USB connector as port 111, and the user USB device 195 could have a mating female USB connector as port 108, and the user PC 105-2 could have a female USB connector as USB port 109, into which a male USB connector as USB port 112 would fit. Other configurations are possible, such as having data path 280-1 being on one USB cable between ports 108 and 111, and the paths 290-1, 285-1 and 285-2 being carried on another USB cable between ports 112 and 109. That is, there typically would be one USB cable (not shown) between ports 112 and 109 and carrying paths 290-1, 285-1 and 285-2. The USB firewall device 200-2 could be powered by the USB bus or by an external power supply. The path 290-3 is a control channel.

In this example, the separate USB firewall device 200-2 has controller (e.g., comprised of firmware) 255, which provides control (once executed) of the USB firewall device 200-2. The USB firewall driver 210 is in the kernel space 101 of the user PC 105-2. Compared to FIG. 1A, where the USB firewall driver 210 and the controller 255 are in the USB firewall 200-1, in USB firewall device 200-2 of FIG. 2A, these are split: the controller 255 is part of the USB firewall device 200-2 and the USB firewall driver 210 is in the user PC 105-2. The database 163 is located in the example of FIG. 2A in a memory 145-1, which could be a volatile or non-volatile cache memory as an example.

In FIG. 2B, this figure illustrates possible internal configuration of the elements of the system in FIG. 2A. The host 105-2 in this example has, in the computer-readable code (CRC) 185-1, the USB firewall UI 205 and the USB firewall driver 210. The USB firewall device 200-2 comprises one or more memories 145-1, one or more processors 110-1, and one or more network (NW) interfaces (I/F(s)) 130-1, all interconnected through one or more buses 146-1. The buses 146-1 may be address, data, and/or control buses and may be implemented using many different techniques, such as traces on a board, metallization in a semiconductor, and the like. The one or more memories 145-1 comprise computer readable code 185-2 comprising the controller firmware 255, the USB packet filter 215, and the USB sanitizer 220. The network interface(s) may comprise USB circuitry 131-1. The one or more processors 110-1, in response to executing the computer readable code 185-2, cause the USB firewall device 200-2 to perform the operations described herein. In another example, part or all of the computer readable code 185-2 could be implemented in hardware, such as in circuitry 115-1.

The database 163 may be in the memory 154-1 of the USB firewall device 200-2, as databased 163-1. Alternatively or in addition, some or all of the database 163 may reside in the host 105-2. For instance, the USB firewall UT 205 could download a large database 163-2, and then provide only a portion of the database, as database 163-1, that corresponds to the current USB device 195.

While the computer systems 105 described herein are mainly described as personal computers, these computer systems 105 may be personal computer systems, laptops, servers, smartphones, tablets, notebooks, televisions, home theater receivers, or any other device with USB capabilities.

Figure 3:
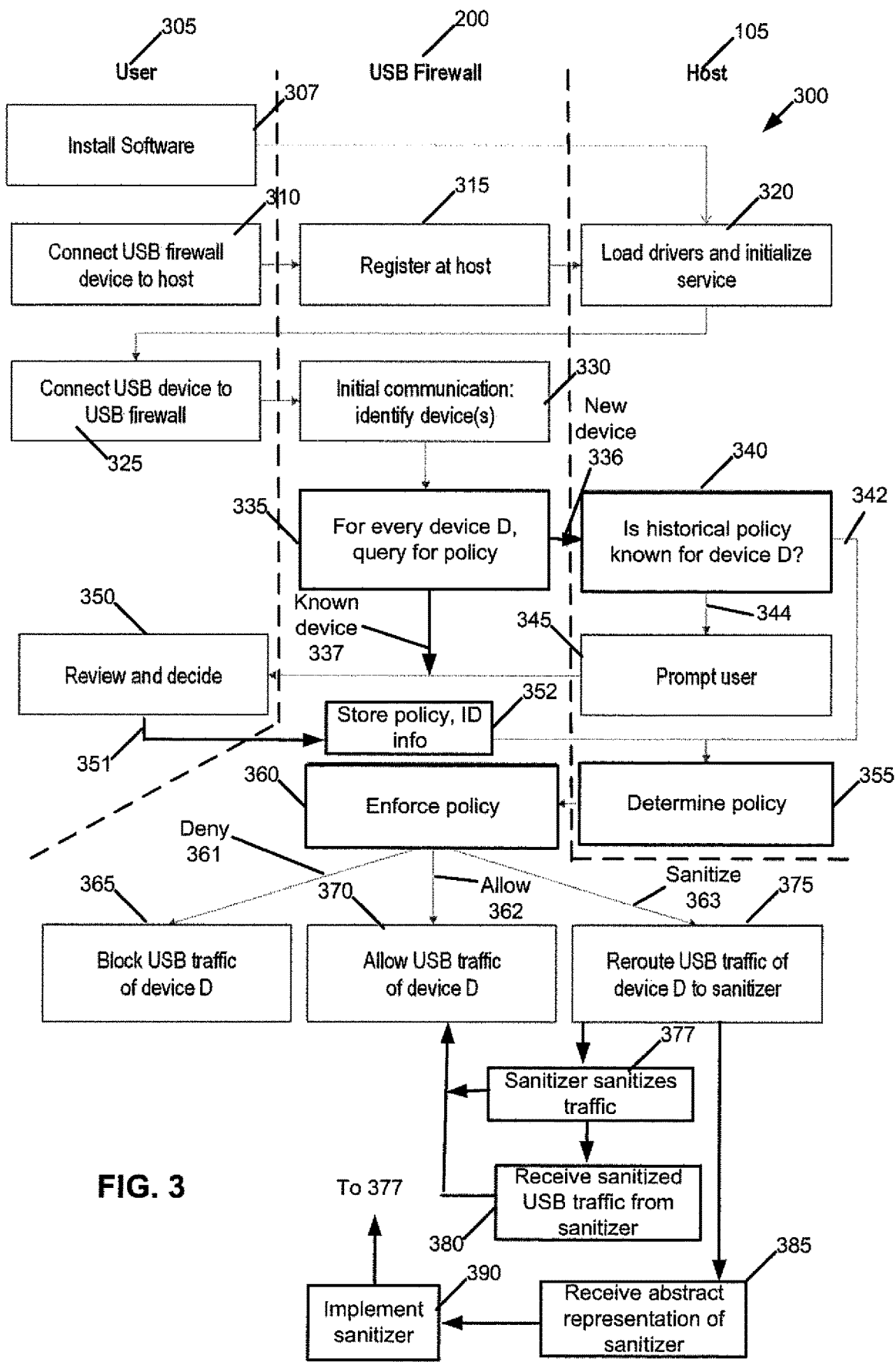
FIG. 3 is a logic flow diagram for protecting computer systems from malicious USB devices via a USB firewall, and illustrates the operation of an exemplary method, a result of execution of computer program instructions embodied on a computer readable memory, functions performed by logic implemented in hardware, and/or interconnected means for performing functions in accordance with exemplary embodiments.

Referring to FIG. 3, this figure is a logic flow diagram for protecting computer systems from malicious USB devices via a USB firewall. Furthermore, this figure illustrates the operation of an exemplary method, a result of execution of computer program instructions embodied on a computer readable memory, functions performed by logic implemented in hardware, and/or interconnected means for performing functions in accordance with exemplary embodiments. The figure distinguishes activities of the user 305 (left column), hardware-based or software-based USB firewall 200 (middle column), and host system 105 (right column). Note, however, that blocks after block 360 are not performed by the user or the host but instead by the USB firewall 200. This figure can be considered as providing a system overview.

Block 305 corresponds to embodiment 1, as illustrated by FIG. 1. In this embodiment, the user 305 installs software in block 307, and the installed software creates the USE firewall 200-1 (e.g., and the USB firewall UI 205). For instance, in the installation, the kernel module is loaded to sink all USB communication to itself. This can occur through an installation process, such as through an application installation, e.g., including an "app" such as found in stores for wireless mobile devices.

Blocks 310 and 315, meanwhile, correspond to embodiment 2, as illustrated by FIG. 2. In block 310, the user connects the USB firewall device 200-2 to the host system. In the case of the separate USB firewall device 200-2, the user 305 would connect the USB firewall 200-2 to the host 105. Upon connection, the firewall 200-2 registers (block 315) itself at the system level. This can entail installation of the USB firewall US 105 and the USB firewall driver 210.

For both embodiments, the corresponding drivers and services are loaded and enabled and the service is initialized (block 320). The user would like to use a USB device D 195. He or she connects the device D 195 to the USB firewall in block 325, which for the software-based USB firewall 200-1 means the user 305 connects the device 195 to the system and for the hardware-based USB firewall 200-2, the user 305 connects the device 195 to the USB firewall 200-2. Upon connection, the USB firewall 200 acts as an interim host (e.g., host controller) and communicates with device D 195. The device D 195 will provide its device identifier, interface, and class. This occurs in block 330, where there is an initial communication and the USB firewall 200 identifies the device.

In an exemplary embodiment, for a new end-point device D 195 seen by the USB firewall 200, a query is sent (block 335) over the control channel (path 290) to a host driver (e.g., USB firewall driver 210). The host driver is the driver of the firewall 210 on the host (i.e., the endpoint on the host 105-2 of the established management channel between the firewall controller and host/user). The USB firewall driver 210 provides connection to the USB firewall device 200-2. The host service (e.g., the USB firewall UI 205) checks whether the present device D 195 has or has not been seen in the past such that a historical policy is or is not known (respectively) for device D 195 (block 340). A historical policy is a decision that has been or is made, governing a future observation, and a policy defines enforcement action(s) performed by the firewall 200.

In one possible technique, the first time a new device D 195 (or a device that is not in the local cache, e.g., memory 145 of the software firewall 200-1 or hardware-based firewall 200-2) is connected, the controller 255 will make a lookup and ask the USB firewall driver 210 (e.g., internally to the USB firewall 200-1 or over the control channel 290-1 for USB firewall device 200-2) whether the USB device 195 has been seen before. See the path 336 for a new device. The reason is that the rules 151/152 can be held in volatile "cache" memory on the firewall device 200-2, e.g., it may be that only the host device 105-2 has non-volatile memory where rules are persisted. After the volatile (in this example) cache has been updated, the firewall controller 255 (and packet filter 215 and/or sanitizer 220) can work off the cache directly without querying the host 105. That is, if the device D 195 is a known device for block 335, the path 337 for the known device is traversed to block 350.

In other examples, rules 151/152 may also be downloaded upon the moment the firewall device 200-2 is connected to the host or the USB firewall 200-1 is started/installed and the firewall controller 250 initializes. Nevertheless, if a previously unseen device D 195 appears (for which no set of rules 151/152 has ever been persisted), then the host 105 will be queried, which, in turn, will also query the USB Firewall UI 205 to ask the user for input.

Additionally, rules 151/152 may be persisted both [a] on the host (most likely the case in practice) or [b] the firewall (as an alternative) (or possibly both [a] and [b]). For option [a], rules 151/152 are downloaded to the firewall either upon initialization of the firewall or upon need. In both cases [a] and [b], the user is interrogated about his or her policy for any new device D not existing in the persisted set.

It is further noted that a device D 195 may only broadcast information indicating a device class (e.g., VID/PID) or information identifying a specific device (e.g., serial number, if it is provided by a given USB device) or possibly both. What this means, in reality, is that a system might not be able to determine that a specific device is unseen but only that the device is an unseen device class. As an example, if a user connects two identical keyboards, i.e., with the same VID/PID, a system cannot distinguish them necessarily, unless a serial number or other specific ID is provided. Regardless, the device class (e.g., based on the VID/PID) may be used by the system to control access between the device D 195 and the host 105.

Such broadcasted information may be stored, e.g., for use in a subsequent attachment of the USB device 195. For instance, see block 352 in FIG. 3.

If the historical policy is known for the device D (reference 342), the policy (e.g., one of allow or deny or sanitize) is returned to the USB firewall 200 in block 355. If the historical policy is not known for the device D (reference 344), the USB firewall UI 205 will inform the user 305 that a new device has been discovered at the firewall and prompt (block 345) the user 305 for a policy (e.g., allow/deny/sanitize as illustrated in UI 261 of FIG. 1). The user reviews the information, e.g., the "New USB device found. Allow, Deny, Sanitize?" message in the UI 261 of FIG. 1, and makes a decision (block 350 of FIG. 3). Making the decision includes informing the host 105 of a policy. The user-provided policy (e.g., one of accept, deny, or sanitize, depending on which button 263, 264, 265 is selected, see FIG. 1) is stored (block 352) generally by the host first then sent over to the firewall controller 205 (e.g., to keep the sequence correct), as the USB firewall UI 205 is on the host 105. The policy may be stored with enough information (ID info) regarding the USB device 195 to be able to identify uniquely the USB device 195 in the future. Concerning these IDs, not all USB devices may have a unique ID, but they have VID and PID (vendor and product IDs) to uniquely identify the same type of device (model/make of keyboard, camera, etc.). However, some USB devices may also deliver a unique serial number, which can be utilized by the policy enforcer (e.g., packet filter 215) in addition for more fine-grained filtering (such as either by class of device or by specific serial number).

Blocks 340 and 345/350 of FIG. 3 proceed through respective paths 342 and 351 to block 355, where the policy is determined by the host 105. For the first time a device (or device class) D connects/sends a packet to the USB firewall 200, block 355 is performed by the host 105. For every subsequent packet/communication, this policy may be cached by the USB firewall such that only block 360 applies. For all subsequent communication, the policy is cached in the USB firewall packet filter 215 and applied without involving the host. The USB packet filter 215 enforces (block 360) the policy, e.g., by routing the packets according to the policy. Note that this enforcement can use the rules 151. If the policy is Deny 361, no packets will be routed by the USB packet filter 215 (e.g., all communications between the user USB device 195 and the application 141/host 105 are blocked). See block 365. By contrast, if the policy is Allow 362, then packets will be freely routed by the USB packet filter 215 between the user USB device 195 and the host 105 (and, e.g., the application 141). See block 370. It is noted the USB filter 215 would perform the blocking or allowing of packets, e.g., using rules 151.

If the policy is Sanitize 363, USB traffic (e.g., packets) from the user USB device 195 toward the application 141 is rerouted to a sanitizer. See block 375. Typically, the USB packet filter 215, e.g., using the rules 151 sends certain packets to the sanitizer 220 of FIGS. 1 and 2. The sanitizer 220 sanitizes the traffic in block 377 and then the USB firewall 200 allows the sanitized traffic to proceed toward the application 141 in block 377. The sanitizer 220 would use the rules 152 in its sanitization.

In other embodiments, it is possible for the USB firewall to use an external device referred to as a sandbox. This is describe in reference to FIG. 4, but briefly, the sandbox may sanitize the USB traffic in block 377 and that sanitized USB traffic of the user USB device 195 is received in block 380 and then the USB traffic is allowed in block 370. In another example, the USB firewall 200 will receive from the sandbox an abstract representation of the sanitizer 220. See block 385. This abstract representation is implemented in block 390, and the implemented sanitizer then performs the sanitization in block 377 and the USB firewall 200 allows the USB traffic in block 370. These are described in more detail in reference to FIG. 4.

Figure 4A:
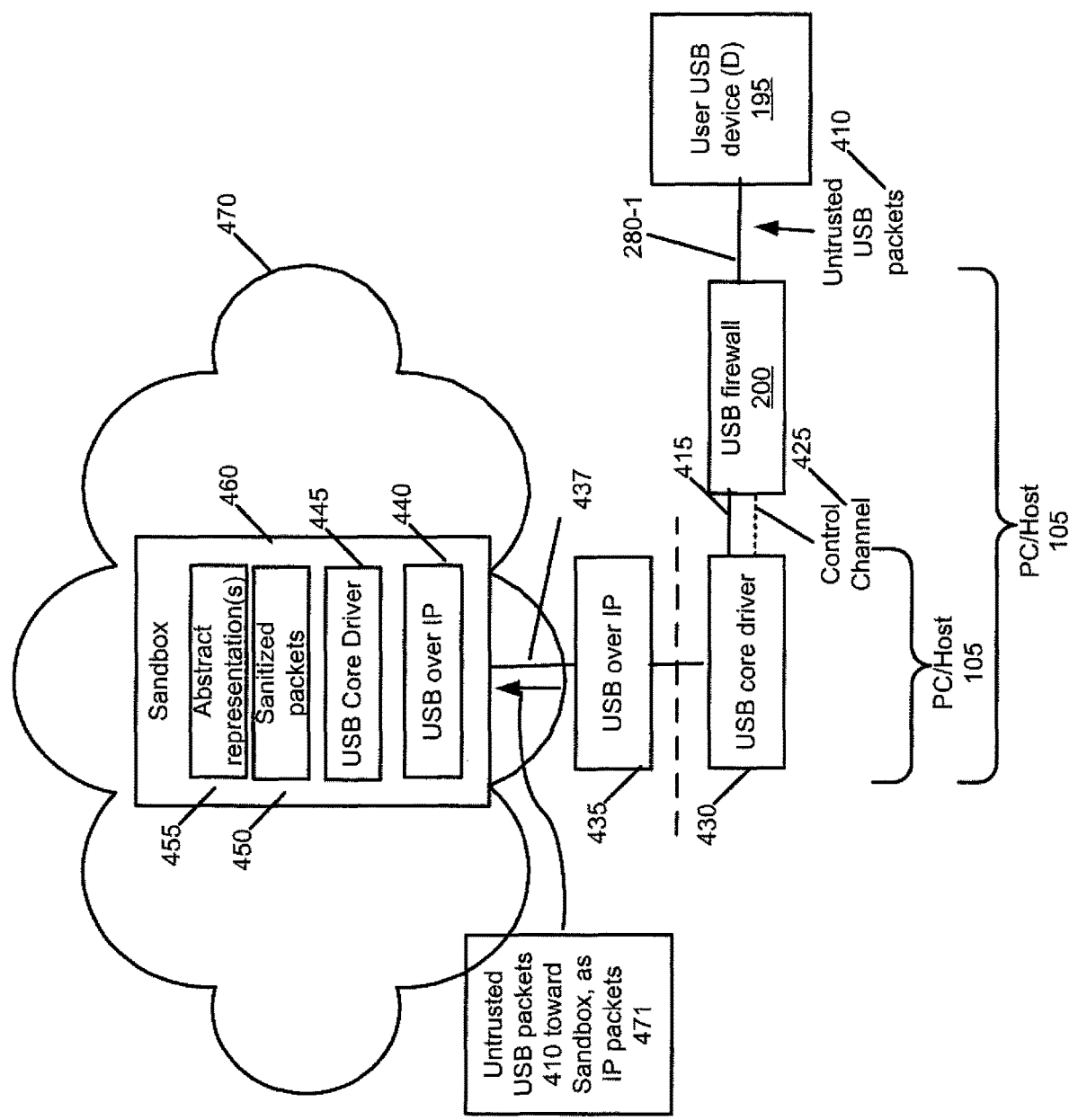
FIG. 4A presents USB traffic rerouting in a system from a user PC (host) into a sandbox.
Figure 4B:
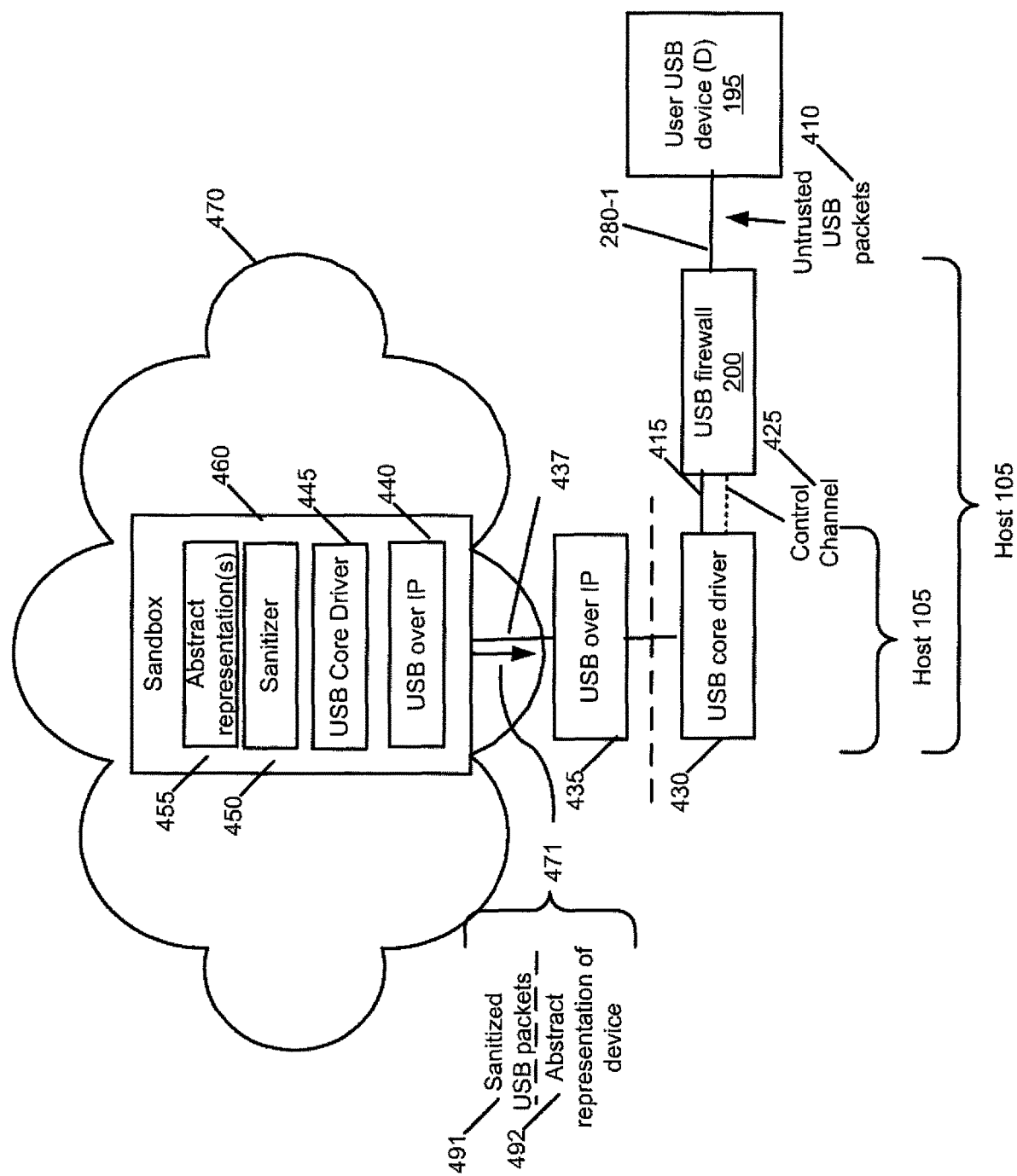
FIG. 4B illustrates routing USB traffic in the system from FIG. 4A from the sandbox into the user PC.

Turning to FIG. 4, which includes FIGS. 4A and 4B, this figure contains block diagrams of a possible and non-limiting exemplary embodiment. FIG. 4A presents USB traffic rerouting in a system from a user PC (host) into a sandbox 460, and FIG. 4B illustrates routing USB traffic or other information in the system of FIG. 4A from the sandbox into the user PC. In more detail, FIG. 4A provides a diagram illustrating how USB traffic is forwarded (e.g., on top of the IP, Internet Protocol, protocol) to a cloud-based USB sanitizer (called a "sandbox") for closer inspection of packets from the user USB device and therefore the user USB device itself. Meanwhile, FIG. 4B illustrates a return channel for the sanitizer: after acting as a cleansing tool, the sanitizer may return sanitized USB traffic or an abstract representation of the device (e.g., proxied access to files on a mass storage device, driver sanitized access). That is, the USB traffic represents an abstract version of the device; i.e., the sanitizer translates the commands into a sanitized version of commands with the same semantic meaning for the device class.

In FIG. 4A, the user USB device 195 is connected to the USB firewall 200 via data path 280-1. Untrusted USB packets 410 are sent over the data path 280-1, from the user USB device 195 toward the user PC 105 (and its application 141, not shown in this figure). The user PC 105 in this example comprises the USB core driver 430, and may or may not comprise the USB firewall 200 as described above. Between the USB firewall 200 and the USB core driver 430, there is a control channel 425, used to communicate control information, and a data channel 415, over which at least the untrusted USB packets 410 travel.

The USB core driver 430 can package the untrusted USB packets 410 over IP (see USB over IP block 435) using IP packets 471 and these IP packets 471 are communicated via path 437, which could be wired or wireless or both. The untrusted USB packets 410 are received over IP at the sandbox 460. See block 440 (USB over IP). Reference 470 is used to indicate the Internet, the cloud, and/or other wired or wireless networks. The sandbox 460 is a computer system that analyzes the USB packets 410 using the USB core driver 445. The USB core driver 445 converts the IP packets 471 back to untrusted USB packets 410 and also performs analysis of the packets 410, e.g., using an abstract representation of a sanitizer corresponding to a USB device. The sanitizer can use rules such as those in rules 152.

In FIG. 4B, for USB packets 410 that are sanitized, these sanitized USB packets 491 may be repackaged into IP packets 472, as performed by USB over IP block 440. The IP packets 472 are communicated over a path 437, e.g., using the IP protocol.

In another example, the sandbox 460 analyzes the untrusted USB packets 410 and provides an abstract representation 492 of the user USB device 195, which therefore provides class and its generic commands for the USB device, which is packaged by the sandbox into IP packets 471 and communicated over the path 437 to the user PC 105.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following abbreviations that may be found in the specification and/or the drawing figures are defined as follows:
CRC computer-readable code
ID identification or identifier
I/F interface
IP Internet protocol
I/O input/output
MIDI musical instrument digital interface
MitM man-in-the-middle
NTFS new technology file system
NW network
OS operating system
PC personal computer
PID product ID
SSL secure sockets layer
UI user interface
USB universal serial bus
VID vendor ID

What is claimed is:

1. A method, comprising:
intercepting universal serial bus (USB) traffic between a USB device and a computer system;
determining whether the USB device has previously had a policy associated with it as to whether USB traffic from the device should be blocked, allowed, or sanitized, wherein any one of blocked, allowed, or sanitized can be indicated by the policy;
in response to not having a previous policy for the USB device, requesting that a user be prompted to provide a policy of one of block, allow, or sanitize for the USB device to provide a user-provided policy, wherein any one of block, allow, or sanitize can be selected and indicated by the user in the user-provided policy; and
in response to and based on the user-provided policy, performing the selected one of blocking the traffic, allowing the traffic, or sanitizing the traffic from the USB device toward the computer system, wherein sanitizing the traffic comprises changing or translating certain commands or requests that are known to be problematic into other commands or requests that are known to be good,
wherein sanitizing the traffic between the USB device and the computer system further comprises sending untrusted packets from the USB device through the computer system and toward a sandbox on a network, and receiving sanitized packets through the computer system and from the sandbox.

2. The method of claim 1, further comprising storing the user-provided policy with information to identify the USB device, wherein a next time the intercepting intercepts traffic from the USB device, the determining whether the USB device has previously had a policy associated with it uses the stored information to identify the USB device, and the user-provided policy of one of blocking the traffic, allowing the traffic, or sanitizing the traffic between the USB device and the computer system is performed.

3. The method of claim 1, wherein performing the selected one of blocking the traffic, allowing the traffic, or sanitizing the traffic is performed in part by a packet filter using a set of rules corresponding to the USB device.

4. The method of claim 1, wherein requesting that a user be prompted to provide a policy comprises causing a message to be displayed on a user interface of a display, the message indicating the user should provide a policy of any one of block, allow, or sanitize for the USB device and defined to allow the user to provide a policy of any one of block, allow, or sanitize for the USB device.

5. The method of claim 1, wherein:
the method is performed by a USB firewall device physically separate from the computer system and coupled to the computer system though at least one USB port; and
requesting that a user be prompted to provide a policy of any one of block, allow, or sanitize for the USB firewall device further comprises sending by the USB firewall device the request to the computer system to request the computer system to prompt the user to provide the policy.

6. The method of claim 1, wherein:
the method is performed by a USB firewall installed in and executed on the computer system; and
requesting that a user be prompted to provide a policy of any one of block, allow, or sanitize for the USB device further comprises sending by the USB firewall the request to a USB firewall user interface component implemented by the computer system and that causes the computer system to prompt the user to provide the policy.

7. The method of claim 1, wherein performing the selected one of blocking the traffic, allowing the traffic, or sanitizing the traffic between the USB device and the computer system further comprises:
filtering, using a first set of rules, the USB traffic from the USB device to the computer system by performing an appropriate one of dropping USB traffic from the USB device in response to blocking the traffic being selected, forwarding the USB traffic from the USB device to the computer system in response to allowing the traffic being selected, or sending packets for sanitization in response to sanitizing the traffic being selected; and
sanitizing, using a second set of rules, the USB traffic in response to sanitizing the traffic being selected.

8. An apparatus, comprising:
one or more memories comprising computer readable code stored thereon;
one or more processors, the one or more processors configured, in response to retrieval and execution of at least a portion of the computer readable code, to cause the apparatus to perform operations comprising:
intercepting universal serial bus (USB) traffic between a USB device and a computer system;
determining whether the USB device has previously had a policy associated with it as to whether USB traffic from the device should be blocked, allowed, or sanitized, wherein any one of blocked, allowed, or sanitized can be indicated by the policy;
in response to not having a previous policy for the USB device, requesting that a user be prompted to provide a policy of one of block, allow, or sanitize for the USB device to provide a user-provided policy, wherein any one of block, allow, or sanitize can be selected and indicated by the user in the user-provided policy; and
in response to and based on the user-provided policy, performing the selected one of blocking the traffic, allowing the traffic, or sanitizing the traffic from the USB device toward the computer system, wherein sanitizing the traffic comprises changing or translating certain commands or requests that are known to be problematic into other commands or requests that are known to be good,
wherein sanitizing the traffic between the USB device and the computer system further comprises sending untrusted packets from the USB device through the computer system and toward a sandbox on a network, and receiving sanitized packets through the computer system and from the sandbox.

9. The apparatus of claim 8, wherein the one or more processors are configured, in response to retrieval and execution of at least a portion of the computer readable code, to cause the apparatus to perform operations comprising: storing the user-provided policy with information to identify the USB device, wherein a next time the intercepting intercepts traffic from the USB device, the determining whether the USB device has previously had a policy associated with it uses the stored information to identify the USB device, and the user-provided policy of one of blocking the traffic, allowing the traffic, or sanitizing the traffic between the USB device and the computer system is performed.

10. The apparatus of claim 9, wherein the information to identify the USB device comprises one or more of an indication of a device class or information identifying a specific USB device.

11. The apparatus of claim 8, wherein performing one of blocking the traffic, allowing the traffic, or sanitizing the traffic is performed in part by a packet filter using a set of rules corresponding to the USB device, and the packet filter is embodied in the computer readable code and executed by the one or more processors.

12. The apparatus of claim 11, wherein:
the set of rules is a first set of rules;
the packet filter sends packets to a sanitizer based on the first set of rules;
sanitizing the traffic further comprises the sanitizer using a second set of rules corresponding to the USB device to sanitize packets from the USB device toward the computer system.

13. The apparatus of claim 12, wherein the one or more processors are configured, in response to retrieval and execution of at least a portion of the computer readable code, to cause the apparatus to perform operations comprising: one of accessing the computer system to request one or both of the first or second set of rules or accessing a memory to retrieve one or both of the first or second set of rules, wherein a first time a given USB device is seen, the accessing the computer system to request one or both of the first or second set of rules is performed and the requested one or both of the first or second set of rules are cached in the memory, and for subsequent communications involving the given USB device, the accessing the memory to retrieve the one or both of the first or second set of rules is performed.

14. The apparatus of claim 13, wherein accessing the computer system to request one or both of the first or second set of rules further comprises accessing through the computer system a network to request one or both of the first or second set of rules.

15. The apparatus of claim 8, wherein requesting that a user be prompted to provide a policy comprises causing a message to be displayed on a user interface of a display, the message indicating the user should provide a policy of any one of block, allow, or sanitize for the USB device and defined to allow the user to provide a policy of any one of block, allow, or sanitize for the USB device.

16. The apparatus of claim 8, wherein:
the apparatus comprises a USB firewall device physically separate from the computer system and coupled to the computer system though at least one USB port, the USB firewall device comprising the one or more memories and the one or more processors;
the USB device is separate from but coupled to the USB firewall device though at least one USB port; and
requesting that a user be prompted to provide a policy of any one of block, allow, or sanitize for the USB device further comprises sending by the USB firewall device the request to the computer system to request the computer system to prompt the user to provide the policy.

17. The apparatus of claim 8, wherein:
the apparatus comprises the computer system, which comprises the one or more memories and one or more processors, and the computer system further comprises a USB firewall and a USB firewall user interface component in the computer readable code and retrieved and executed by the one or more processors;
the USB firewall performs the intercepting USB traffic and the determining whether the USB device has previously had a policy associated with it;
the USB device is separate from but coupled to the computer system though at least one USB port; and
requesting that a user be prompted to provide a policy of any one of block, allow, or sanitize for the USB device further comprises sending by the USB firewall the request to the USB firewall user interface component, wherein the USB firewall user interface component causes the computer system to prompt the user to provide the policy.

18. The apparatus of claim 17, wherein the USB firewall runs, with privileged access to system resources and in protected memory, in a kernel space as part of a kernel of an operating system implemented by the computer system.

19. An apparatus, comprising:
one or more memories comprising computer readable code stored thereon;
one or more processors, the one or more processors configured, in response to retrieval and execution of at least a portion of the computer readable code, to cause the apparatus to perform operations comprising:
intercepting universal serial bus (USB) traffic between a USB device and a computer system;
determining whether the USB device has previously had a policy associated with it as to whether USB traffic from the device should be blocked, allowed, or sanitized, wherein any one of blocked, allowed, or sanitized can be indicated by the policy;
in response to not having a previous policy for the USB device, requesting that a user be prompted to provide a policy of one of block, allow, or sanitize for the USB device to provide a user-provided policy, wherein any one of block, allow, or sanitize can be selected and indicated by the user in the user-provided policy; and
in response to and based on the user-provided policy, performing the selected one of blocking the traffic, allowing the traffic, or sanitizing the traffic from the USB device toward the computer system, wherein sanitizing the traffic comprises changing or translating certain commands or requests that are known to be problematic into other commands or requests that are known to be good,
wherein sanitizing the traffic between the USE device and the computer system further comprises sending one or more untrusted packets from the USB device through the computer system and toward a sandbox on a network, receiving an abstract representation of the USB device through the computer system and from the sandbox, the abstract representation providing at least a device class and generic commands for the USB device, and implementing the abstract representation of the USB device to sanitize the one or more entrusted packets that were sent and to sanitize any additional packets from the USB device toward the computer system, the sanitizing comprising translating commands into a sanitized version of commands with a same semantic meaning for the device class.

20. A computer program product comprising a non-transitory computer readable storage medium having program instructions embodied therewith, the program instructions executable by a device to cause the device to perform operations comprising:
intercepting universal serial bus (USB) traffic between a USB device and a computer system;
determining whether the USB device has previously had a policy associated with it as to whether USB traffic from the device should be blocked, allowed, or sanitized, wherein any one of blocked, allowed, or sanitized can be indicated by the policy;
in response to not having a previous policy for the USB device, requesting that a user be prompted to provide a policy of one of block, allow, or sanitize for the USB device to provide a user-provided policy, wherein any one of block, allow, or sanitize can be selected and indicated by the user in the user-provided policy; and
in response to and based on the user-provided policy, performing the selected one of blocking the traffic, allowing the traffic, or sanitizing the traffic from the USB device toward the computer system, wherein sanitizing the traffic comprises changing or translating certain commands or requests that are known to be problematic into other commands or requests that are known to be good,
wherein sanitizing the traffic between the USB device and the computer system further comprises sending untrusted packets from the USB device through the computer system and toward a sandbox on a network, and receiving sanitized packets through the computer system and from the sandbox.

\* \* \* \* \*